United States Patent [15] 3,637,490
Gardner et al. [45] Jan. 25, 1972

[54] FLOTATION OF SOLIDS FROM WASTE WATERS

[72] Inventors: William H. Gardner; Norval F. Stanley, both of La Vale, Md.

[73] Assignee: Hercules Incorporated, Wilmington, Del.

[22] Filed: July 27, 1970

[21] Appl. No.: 58,444

[52] U.S. Cl. ................................................210/44, 210/51
[51] Int. Cl. ..........................................................C02c 1/18
[58] Field of Search ........................210/44, 51, 221; 252/61; 209/161–164

[56] References Cited

UNITED STATES PATENTS 3,404,088 10/1968 Dujardin................................210/44
3,171,803 3/1965 Rice et al...............................210/53 X
3,224,582 12/1965 Iannicelli................................209/166

Primary Examiner—Michael Rogers
Attorney—Michael B. Keehan

[57] ABSTRACT

In a method for the removal of waste solids from industrial and municipal waste water in flotation apparatus, the improvement comprising; blending into the waste water, prior to flotation, a sufficient amount of flotation agent and flocculant to effect rapid flotation of the waste solids from the waste water, passing the blended mixture thus formed into the flotation apparatus, removing the waste solids from the flotation apparatus as scum, and removing the remaining waste water from the flotation apparatus as effluent. Microballoon agents and flocculant polymers are utilized.

6 Claims, 2 Drawing Figures

INVENTION
SCHEMATIC OF FLOCCULATION-FLOTATION PROCESS

PATENTED JAN 25 1972

3,637,490

CONVENTIONAL
SCHEMATIC OF DISSOLVED-AIR FLOTATION PROCESS

INVENTION
SCHEMATIC OF FLOCCULATION-FLOTATION PROCESS

WILLIAM H. GARDNER
NORVAL F. STANLEY
INVENTORS

BY William J. Smith

AGENT

FLOTATION OF SOLIDS FROM WASTE WATERS

This invention relates to the removal of solids from industrial and municipal waste waters. More particularly, this invention relates to a flotation method whereby a solid flotation agent and a flocculant are added to waste water to effect coflocculation with the waste solids so that the resultant flocs containing the waste solids rapidly separate. In commercial flotation processes for removal of waste solids from municipal or industrial waste water, air is generally employed to effect the flotation and the separation rate obtainable is considerably less than the rate obtainable by the present invention.

Figure 1:
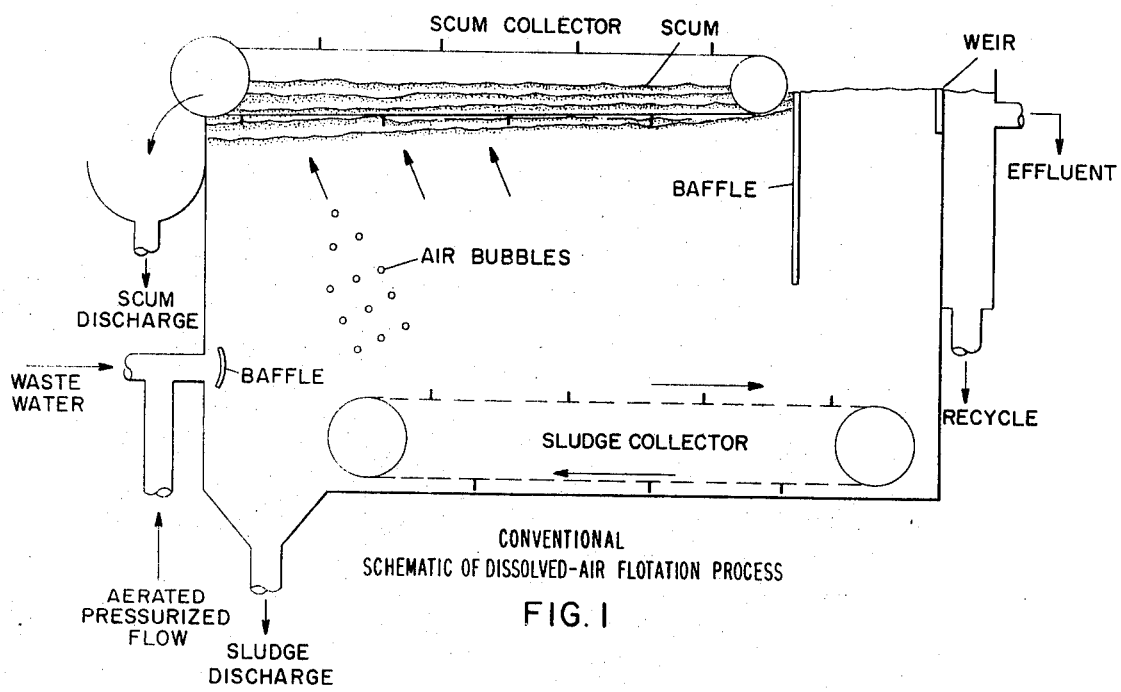

More specifically, a conventional dissolved-air flotation process for removal of waste solids from waste water is schematically shown in FIG. 1. The mechanisms and driving forces for flotation processes are well known in the art. In a dissolved-air flotation process, small air bubbles (less than 100 microns) attach to the waste solids and cause them to float to the surface for removal by a scum collector. The effect of the air bubbles is to increase the difference in densities between the particles and the suspending medium. As the density difference increases, the solids separation rate increases. The resultant scum layer is a mixture of solids and air bubbles which is usually compacted and treated further.

When a waste can be treated by flotation rather than sedimentation (the more commonly used separation process), improved separation rates are achieved. A flotation process permits smaller sludge basins and sometimes allows a higher water recovery. However, much higher flotation rates are desirable for economic reasons and coflocculation with low-density solids in accordance with the invention is one way of achieving significantly higher rates.

One particular advantage of using low-density solids rather than dissolved air is operating cost. Although conventional dissolved-air flotation processes require lower capital investment than conventional sedimentation processes, operating costs are higher due to the pumping costs. On an equivalent treatment basis, however, flotation becomes cost effective due to the increased capacity obtainable with the flotation processes.

Design overflow rates are generally 3–6 g.p.m./ft.$^2$ for dissolved-air flotation operations. Improvement of design overflow rates in the order of 10 g.p.m./ft.$^2$ is indicated with the flocculation-flotation method of this invention schematically shown in FIG. 2. More particularly, this invention contemplates a method for the removal of waste solids from industrial and municipal waste water in flotation apparatus wherein the improvement comprises blending into the waste water, prior to flotation, a sufficient amount of flotation agent and flocculant to effect rapid flotation of the waste solids from the waste water, passing the blended mixture thus formed into the flotation apparatus, removing the waste solids from the flotation apparatus as scum, and removing the remaining waste water from the flotation apparatus as effluent.

Figure 2:
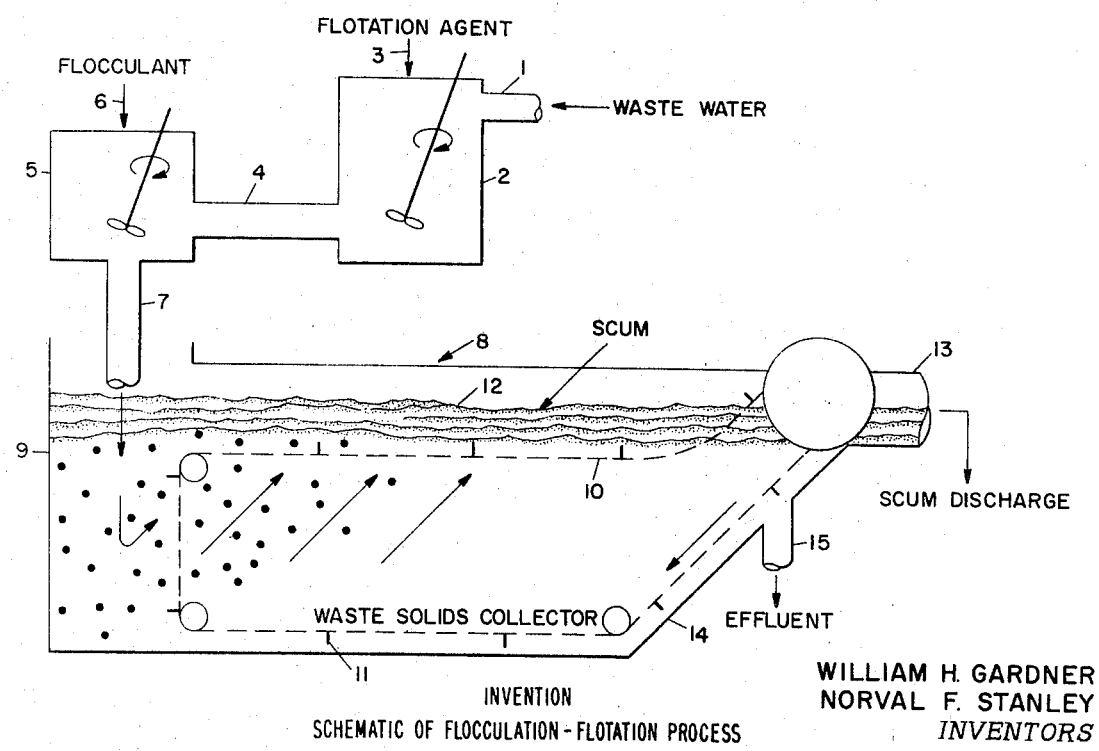

With reference to FIG. 2, waste water to be treated is fed through conduit 1 into a flotation agent vessel 2 provided with agitation means. Flotation agent is fed into the vessel 2 through line 3 with both streams being continuously fed into the vessel 2 with continuous agitation. The mixture of waste water and flotation agent is continuously passed from the vessel 2 through conduit 4 into flocculant vessel 5 provided with agitation means. Flocculant is fed into the vessel 5 through line 6 and is continuously agitated with the mixture of waste water and flotation agent and the mixture thus formed is continuously passed from the vessel 5 through conduit 7 into the flotation apparatus represented by 8.

The flotation apparatus 8 comprises a rectangular vessel 9 having a continuously moving waste solids collector belt 10 disposed therein. The collector belt 10 is of the endless type provided with paddles 11 to provide for movement of the surface scum 12 into and through a discharge trough 13 to scum discharge and to provide for gentle agitation of the waste water beneath the scum layer. The vessel 9 subjacent to the discharge trough 13 has a declined surface 14 along which the collector belt 10 passes. An effluent conduit 15 positioned in the upper portion of the declined surface 14 and beneath the scum layer 12 is provided for removal of the treated waste water from the apparatus 8.

The following examples will serve to illustrate the invention wherein it will be appreciated in conjunction with apparatus as illustrated in FIG. 2, that the addition of a low-density solid flotation agent and the subsequent addition of flocculant to the waste water prior to treatment in flotation equipment yields flocs (sludge) which will separate very rapidly.

EXAMPLE 1

A municipal sewage waste water was obtained from the Municipal Waste Treatment Plant of Bowling Green, Maryland. This waste water contained about 100 p.p.m. of suspended waste solids and was treated by adding Bakelite microballoons as the flotation agent and then adding Hercofloc as the flocculant to the waste water in the proportion of 0.1 g. of the microballoons and 0.001 g. of the Hercofloc to 1,000 cc., of the waste water. This mixture was subjected to flotation and a very rapid visual separation and partial clarification of the turbid mixture took effect. Clarification, however, was not complete.

A second treatment was provided similar to the first except that the amount of microballoons was increased to 0.2 g. Upon subjecting this mixture to flotation, visual turbidity was eliminated and complete clarification accomplished. The quantity of microballoons was varied in subsequent treatments and it was found that the degree of clarification and the rate of clarification of the waste water improved up to a practical leveling off of about 0.1 g. of microballoons/g. of sewage solids (g.=gram).

EXAMPLE 2

An industrial waste water from a paint pigment plant at Glens Falls, N.Y. was obtained. This particular waste is a plant effluent which is acid (pH≈3.0) and contains significant amounts of inorganic paint pigment solids. This waste effluent was treated by adding Bakelite microballoons as the flotation agent and then adding Hercofloc as the flocculant in the proportion of about 0.1 g. microballoons and about 0.001 g. of Hercofloc to 1,000 cc. of the waste effluent. Complete visual clarification was obtained within about 30 seconds upon subjecting the mixture to flotation.

Subsequent treatments were conducted with an increase of microballoon dosage. As in example 1, the degree of clarification and the rate of clarification increased with an increase in microballoon dosage up to about 0.2 g./g. of waste solids.

EXAMPLE 3

The industrial waste water of example 2 was also treated with glass microballoons (Eccospheres). In this treatment the proportion of 0.01 g. of the Eccospheres was added to the waste effluent and then 0.0001 g. of Hercofloc to 30 cc. of the effluent. Very rapid, complete visual clarification was obtained demonstrating that the low-density glass microballoons functioned similarly to those of examples 1 and 2. Economic advantages are indicated for the glass microballoons since they can be regenerated by incineration of the recovered sludge and reused. This feature appears particularly attractive in conjunction with a complete waste products treatment plant having incineration and/or pyrolysis units.

The flotation agents suitable for practicing the invention are the small, hollow, hole-free spheres referred to as microballoons. These spheres may be made from any film-forming material such as synthetic resins, including phenol-formaldehyde or ureaformaldehyde, other film-forming materials such as polyvinyl alcohol; natural proteins such as casein, polystyrene; various cellulosic derivatives; polyethylene, polyamides (nylon); inorganic film-forming material such as sodium silicate, sodium aluminate; and various glass or ceramic film-forming materials. The particles have a size range of from one micron to one-eighth of an inch in diameter, and an average diameter of from one micron to 500 microns, a bulk density of 0.02 to 0.35 g./cc., and a liquid displacement density of 0.05 to 0.6 g./cc. The microballoons referred to as Eccospheres in example 3 are manufactured by Emerson Luming, Inc. of Canton, Mass.

The flocculants suitable for practicing the invention include any of the known polymeric flocculants for suspensions comprising essentially organic solids. Both anionic and cationic flocculants are suitable.

The flocculant polymers utilized are those identified as Hercofloc in the examples. The Hercofloc flocculants are water-soluble, organic polymers and may be either anionic or cationic. These flocculant polymers are manufactured by Hercules Incorporated of Wilmington, Del.

In general practice of the invention the flotation agent is added to the waste water in an amount of from about 10 to about 100 p.p.m. and the flocculant is added to the mixture of flotation agent and waste water in an amount of from about 0.1 to about 1 p.p.m. It will be understood, however, that the exact amounts required are determined by the treatment requirements and economics involved in respect to the specific conditions encountered.

From the foregoing, it is evident that this invention is primarily concerned with the high-rate, economical separation of waste solids from waste water by coflocculation of the solids with low-density solids. The high-rate flotation aspect was illustrated in the preceding examples. The economies to be derived from the invention depend to a large extent upon the specific application and includes the nature of the treatment, such as intermittent vs. continuous treatment, as well as effluent quality consideration. Economies for a particular application must be defined by evaluation of the invention applied to a specific application. Possibly the most significant potential use is for the problem of storm-water runoff.

Polluting discharges from combined storm and sanitary sewers occur during wet weather periods when the carrying capacity of the sewers is exceeded due to the large amounts of storm water entering the sewers. The normal, or dry weather flow is prevented from overflowing continuously by means of overflow weirs, mechanical regulators, valves and other devices. These devices permit overflows to occur when sewer flows reach a predetermined level.

Separation of the storm water from the sanitary sewage can be at least a partial answer to the problem since if the systems are completely separated the most concentrated waste load can be conveyed to and treated as the waste treatment plant. However, since surface runoff also contains significant amounts of pollutants, separation is only a partial solution to the total problem.

Thus, in consideration of the foregoing problems it is indicated that the present invention may reduce the treatment costs for storm-flow runoff; permits the use of solid adsorbents such as carbon to remove soluble impurities from municipal waste; provides an economically attractive route for treatment of industrial wastes which vary significantly in solids content and flow rate; and may contribute to improving effluent quality of both industrial and municipal waste by promoting flotation of extremely small particles entrained in the low-density flocs.

What we claim and desire to protect by Letters Patent is:

1. In a method for the removal of waste solids from industrial and municipal waste water in flotation apparatus, the improvement comprising:
   a. blending into the waste water, prior to flotation, a sufficient amount of flotation agent consisting essentially of preformed small, hollow, hole-free spheres and flocculant to effect rapid flotation of the waste solids from the waste water,
   b. passing the blended mixture thus formed into the flotation apparatus,
   c. removing the waste solids from the flotation apparatus as scum, and
   d. removing the remaining waste water from the flotation apparatus as effluent.

2. The method as in claim 1 wherein the flotation agent is added to the waste water prior to addition of the flocculant.

3. The method as in claim 1 wherein the flocculant comprises water-soluble organic polymer.

4. The method as in claim 1 wherein the flotation agent is present in an amount from about 10 to about 100 p.p.m. and the flocculant is present in an amount from about 0.1 to about 1 p.p.m.

5. The method as in claim 4 wherein the flotation agent consists essentially of glass or ceramic microballoons.

6. The method as in claim 4 wherein the flocculant consists essentially of an anionic or cationic water-soluble organic polymer.

* * * * *